(12) United States Patent  
Gavenda et al.

(10) Patent No.: US 7,959,436 B2  
(45) Date of Patent: Jun. 14, 2011

(54) FINE DUST REMOVAL SYSTEM FOR LIME KILN

(75) Inventors: Robert A. Gavenda, Crete, IL (US); William H. Schoof, Seven Fields, PA (US)

(73) Assignee: Carmeuse Lime, Inc.

( * ) Notice: Subject to any disclaimer, the term of this patent is extended or adjusted under 35 U.S.C. 154(b) by 549 days.

(21) Appl. No.: 12/220,955

(22) Filed: Jul. 29, 2008

(65) Prior Publication Data

US 2010/0028821 A1    Feb. 4, 2010

(51) Int. Cl.
*F27B 7/36* (2006.01)

(52) U.S. Cl. .................................. 432/113; 432/117
(58) Field of Classification Search .................. 432/14, 432/103, 113, 117
See application file for complete search history.

(56) References Cited

U.S. PATENT DOCUMENTS

| 3,499,636 A | * | 3/1970 | Hall ............................. 423/177 |
| 3,986,819 A | | 10/1976 | Heian ............................ 432/14 |
| 4,255,131 A | * | 3/1981 | Johnson, Jr. .................... 432/14 |
| 4,256,045 A | * | 3/1981 | Johnson, Jr. .................... 110/345 |
| 5,213,496 A | | 5/1993 | Ahvenainen .................. 432/103 |
| 5,380,505 A | | 1/1995 | College ........................ 432/175 |
| 5,454,715 A | * | 10/1995 | Hansen et al. ................ 432/103 |
| 5,549,058 A | * | 8/1996 | Tutt .............................. 110/226 |
| 5,992,041 A | | 11/1999 | McClaine et al. ............. 34/178 |
| 6,461,153 B2 | | 10/2002 | Eckert et al. ................... 432/14 |

* cited by examiner

*Primary Examiner* — Gregory A Wilson
(74) *Attorney, Agent, or Firm* — Kratz, Quintos & Hanson, LLP

(57) ABSTRACT

A fine dust removal system for a rotary lime kiln includes a preheater adjacent the charging end of the kiln and a housing adjacent to and communicating with kiln charging end, such that a major portion of not off-gases containing solid particulates are diverted to the preheater and a minor portion thereof directed into the housing. At least a portion of the solid particulates is separated from the hot off-gases in the housing, while the hot off-gases leaving the housing, after solid particulate removal, are directed into the preheater.

9 Claims, 2 Drawing Sheets

FINE DUST REMOVAL SYSTEM FOR LIME KILN

FIELD OF THE INVENTION

The present system removes fine dust particles from an off-gas flow discharged from a horizontally disposed rotary lime kiln prior to passage of the off-gases to a preheater used to preheat a charge of limestone fed to the lime kiln.

BACKGROUND OF THE INVENTION

Lime is produced by the calcination of limestone by the removal of $CO_2$ from $CaCO_3$ to produce CaO. The limestone is generally preheated, prior to feeding the same to a kiln, such as a horizontally disposed rotary lime kiln, by passage though a vertically arranged preheating unit through which hot off-gases from the lime kiln flow, in a countercurrent manner. The hot off-gases, contain carbon dioxide and sulfur compounds that result from any sulfur compounds originally present in the limestone charge or in the fuel that is combusted to heat the charge in the rotary kiln. These sulfur compounds and solid particulate sulfur compounds are carried by the off-gases from the kiln through the limestone charge in the preheater, while off-gases preheat the limestone charge.

Because the fine solid particulates leaving the rotary kiln and fed to the preheater contain sulfur compound, and the finer sized solid particulates appear to contain the higher sulfur percentage, it is desirable to remove the solid particulates from the off-gases. Such solid particulates, when passed through the preheater with the hot off-gases can collect on the limestone charge and be recycled to the rotary kiln and increase sulfur compounds in the lime product discharged from the kiln, and can interfere with the preheater operation by causing plugging of the preheater.

In view of such problems, efforts have been made to remove the fine particulates or dust from the hot off-gases of a rotary lime kiln prior to passage through the preheater. Current practices for such removal of particulate material involve the use of screens or by-pass systems.

A problem with the use of screens is that they remove too large of a dust fraction and the finer (higher sulfur portion) remains in the kiln system. The screen deck also warps from the kiln gas temperature, accumulates dust build-up and blinds over. Recent designs use mechanically driven dynamic screens in an attempt to prevent the deck from blinding. These screens are complicated, costly and difficult to maintain. Retrofitting a screen onto an existing preheater is also extremely difficult and costly.

By-pass or stripping systems use ducts or probes with ambient cooling air and an external high-temperature fan to remove some hot kiln gases and dust from the preheater transfer chute. The dust is separated from the gas in an external cyclone and the cooled kiln gases are returned to an air pollution control device. Problems include build-up and plugging of the probe and ducts, additional electrical power usage by the external fan, and the fuel efficiency of the kiln suffers because some hot kiln gas by-passes the preheater. The system is also complicated and costly. An additional air pollution device is required for the by-pass gases if the original device is not large enough.

OBJECT OF THE INVENTION

It is an object of the present invention to provide a system for removal of fine particulates from hot flue gases of a rotary lime kiln prior to passage through a limestone charge preheater that is simple and passive, with no equipment in the highest velocity kiln gas stream, and build-up that is minimal or easily removed because of the aerodynamic design. Minimal additional electrical power usage is required, and there is less detrimental affect on fuel efficiency than other options. It is less costly and easier to maintain. Larger or additional air pollution control devices are not required. The smaller sized (high sulfur) dust fraction is removed, while larger size particles remain in the kiln system. The system can be readily retrofitted onto existing installations.

SUMMARY OF THE INVENTION

A fine dust removal system for a lime kiln is provided, where a rotary lime kiln has a charging end and a discharge end, and a preheater is positioned adjacent the charging end, with hot off-gases containing solid particulates passing from the charging end of the kiln through limestone charge material in the preheater to heat the same prior to charging to the kiln through the charging end. The system includes a housing located adjacent to and communicating with the charging end of the kiln, such that a major portion of the hot off-gases containing solid particulates, from the charging end of the kiln, is directed into the preheater, while a minor portion of the off gases containing solid particulates is directed into the housing. At least a portion of the solid particulates is separated from the hot off-gases and collected in the housing, while the hot off-gases from the housing, after removal of solid particulate, are directed into the preheater.

Preferably, the preheater and the housing are interconnected and are movable, as a unit, toward and away from the charging end of the rotary lime kiln. Also, preferably, horizontal spaced vanes, which may be pivotally adjustable in a vertical direction, are provided across an entry portal between the charging end of the rotary kiln and the housing.

BRIEF DESCRIPTION OF THE DRAWINGS

The present invention will be better understood by reference to the following detailed description, taken in conjunction with the accompanying drawings wherein reference numerals refer to like parts, and wherein.

DETAILED DESCRIPTION

The present invention provides an apparatus and method for removing fine dust particles from a hot off-gas flow of a horizontally disposed rotary kiln prior to passage of the hot gases through a preheater for preheating a charge being fed to the kiln.

Figure 1:
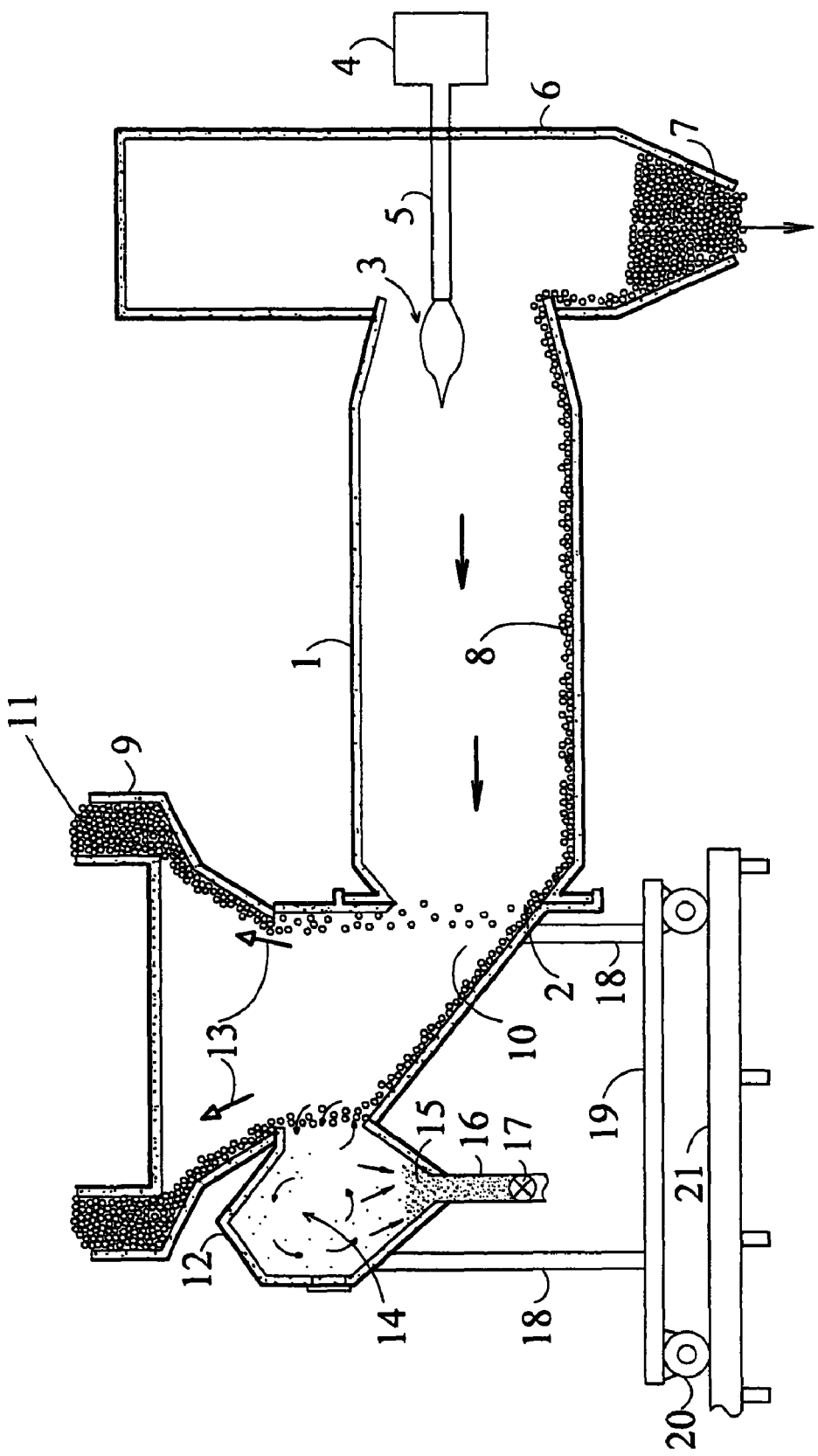
FIG. 1 is a cross-sectional view through an embodiment of the apparatus of the present invention, illustrating an embodiment the present method.

Referring now to FIG. 1, a horizontally disposed rotary lime kiln is shown which has a charging end 2 for limestone and a discharge end 3 for lime produced by calcination in the kiln. The limestone is charged at the charging end of the kiln and travels through the kiln, with a fuel being combusted from a source 4 through a burner 5 adjacent the discharge end 3, and lime produced in the kiln is discharged into a lime collection vessel 6 and then discharged therefrom, as a lime product 7. The combusted fuel provides heat for the calcination of limestone to lime and passes through the rotary kiln countercurrent to the flow of the solids 8 in the kiln. The fuel may comprise a sulfur-containing coal, petroleum coke, or the like, and sulfur products may also be released from the limestone charged to the kiln, with the finer dust particles that are enveloped in the countercurrent flow of combustion gases generally containing higher sulfur content than larger size particles.

A preheater 9 is provided adjacent the charging end 2 which feeds a charge of limestone 10 to the charging end 2 of the rotary kiln 1, and hot off-gases containing solid particulates pass from the charging end 2 of the kiln through a limestone charge 11 in the preheater to heat the charge prior to charging the rotary kiln 1.

According to the present invention, a housing 12 is located adjacent to and communicating with the charging end 2 of the rotary kiln 1, such that a major portion 13 of the hot off-gases containing solid particulates, from the charging end 2 of the rotary kiln, is directed into the preheater 9, while a minor portion 14 of the hot off-gases containing solid particulates 15 from the charging end 2 of the rotary kiln 1 is directed into the housing 12. In the housing 12, at least a portion of the solid particulates in the minor portion 14 of the hot off-gases is separated from the hot off-gases and collected by gravity in the housing at 15 a, while the minor portion of hot off-gases 14, after removal of solid particulates, is returned to the major portion 13 of hot off-gases and fed to the preheater 9. The solid particulates 15, collected in the housing 12 may be periodically discharged therefrom through conduit 16 by valve 17.

As illustrated, the preheater 9 and the housing 12 may be interconnected as a unit and movable as a unit toward and away from the charging end 2 of the rotary kiln 1 by supporting the unit by supports 18 that are attached to a base 19 having wheels 20 that run along a track 21.

The inventors have found that the smaller size particulates tend to contain a higher sulfur content than larger size particulates. According to the present system, the aerodynamic force affecting hot off-gases leaving the charging end of the kiln directs the smaller size (high sulfur) particulates into the housing 12, with particulates 15 removed therein, while off-gases after particulate removal, and the major portion of the off-gases containing larger size particulates are retained in the kiln system.

Figure 2:
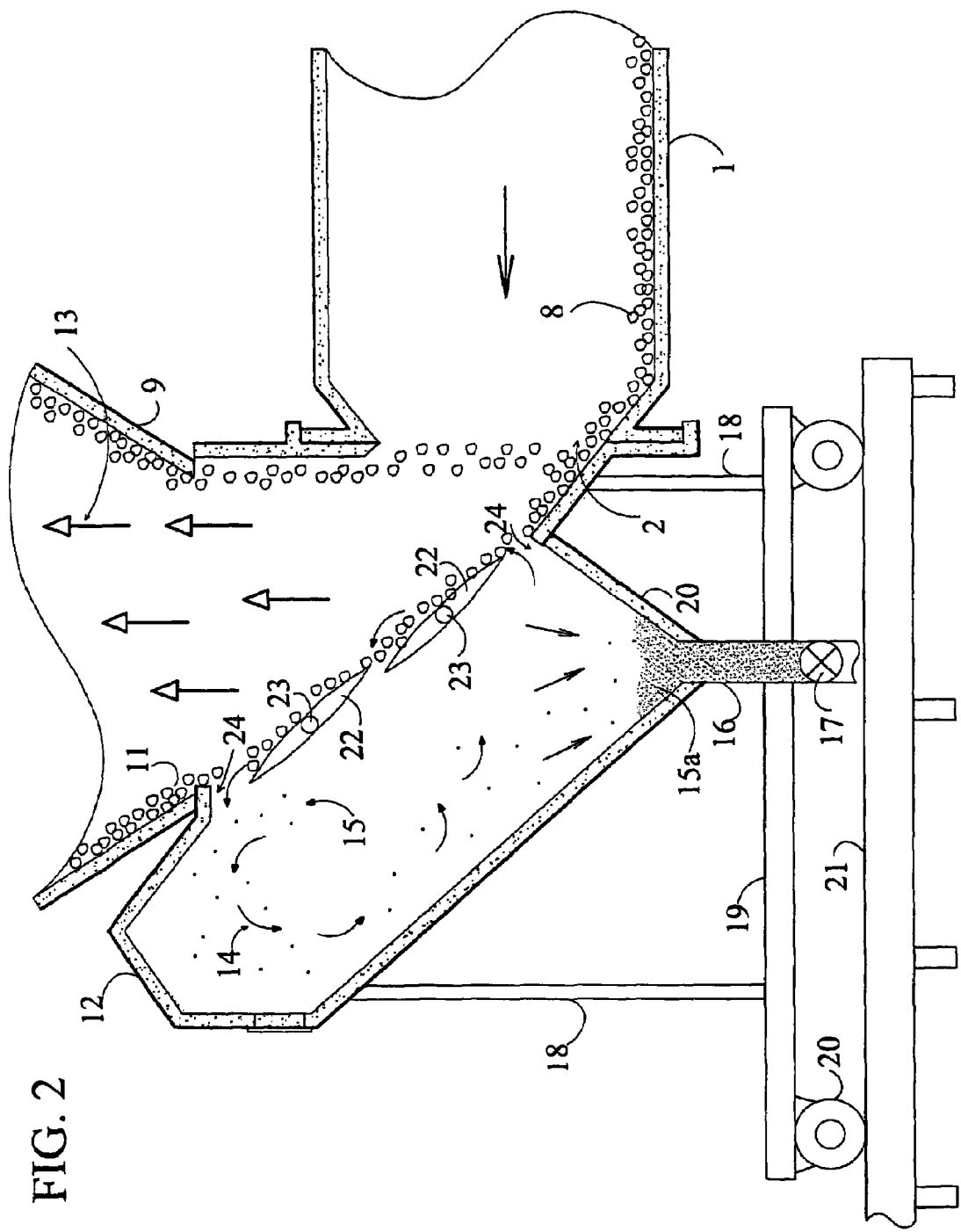
FIG. 2 is a cross-sectional view through another embodiment of the apparatus of the present invention illustrating another embodiment of the present invention.

Another embodiment of the present system is illustrated in FIG. 2, where horizontal, spaced vanes 22, preferably having pivots 23, are provided across an entry portal 24 between the charging end 2 of the rotary kiln 1 and the housing 12, the vanes 22 preferably being pivotally adjustable, such as about pivots 23. The spaced vanes are pivotal in a vertical direction so as to achieve a desired flow of hot off-gases containing solid particulates into the housing 12 dependent on volume and velocity of the flow as well as the solid content. The vanes are preferably hollow, with cooling thereof by air or other cooling of the hollow vanes. The vanes 22 are preferably adjusted to position of about 45° to a horizontal line across the portal 24, but may be adjusted to other desired positions.

What is claimed is:

1. In a rotary lime kiln, having a charging end and a discharge end, and a preheater positioned adjacent the charging end, with hot off gases containing solid particulates passing from the charging end of the kiln through limestone charge material in the preheater to heat the same prior to charging to the kiln through the charging end, the improvement comprising:
    a housing located adjacent to and communicating with the charging end of the kiln, such that a major portion of the hot off gases containing solid particulates from the charging end of the kiln, is directed into the preheater, while a minor portion of the off gases containing solid particulates is directed into the housing, and at least a portion of the solid particulates are separated from the hot off gases and collected in the housing, while the hot off gases from the housing, after removal of solid particulates, are directed into the preheater, wherein horizontal, spaced vanes are provided across an entry portal between the charging end of the rotary lime kiln and the housing.

2. A rotary lime kiln as defined in claim 1, wherein the preheater and housing are interconnected and are movable, as a unit, toward and away from the charging end of the rotary lime kiln.

3. A rotary lime kiln as defined in claim 1, wherein the horizontal, spaced vanes are pivotally adjustable in a vertical direction.

4. A lime kiln as defined in claim 3, wherein the horizontal, spaced vanes are adjusted to a position of about 45° to a horizontal line across the portal.

5. In a rotary lime kiln having a charging end and a discharge end, and a preheater positioned adjacent the charging end, with hot off gases containing solid particulates passing from the charging end of the kiln through limestone charge material in the preheater to heat the same prior to charging to the kiln through the charging end, the improvement comprising:
    a housing located adjacent to and communicating with the charging end of the kiln, interconnected with the kiln and the preheater and housing are movable, as a unit, toward and away from the charging end of the rotary lime kiln, with horizontal, spaced vanes provided across an entry portal between the charging end of the rotary lime kiln and the housing, such that a major portion of the hot off gases containing solid particulates from the charging end of the kiln, is directed into the preheater, while a minor portion of the off gases containing solid particulates is directed into the housing, and at least a portion of the solid particulates are separated from the hot off gases and collected in the housing, while the hot off gases from the housing, after removal of solid particulates, are directed into the preheater.

6. A rotary lime kiln as defined in claim 5, wherein the horizontal, spaced vanes are pivotally adjustable in a vertical direction.

7. A lime kiln as defined in claim 6, wherein the horizontal, spaced vanes are adjusted to a position of about 45° to a horizontal line across the portal.

8. A method, of removing solid particulates from a hot off-gas stream from a horizontally disposed rotary lime kiln having a preheater, containing a limestone charge, disposed adjacent a charging end of the rotary kiln, comprising:
    providing a housing located adjacent to and communicating with the charging end of the rotary lime kiln and intermediate the preheater and the rotary lime kiln;
    directing a major portion of hot off-gases containing solid particulates from the rotary lime kiln into the preheater,
    directing a minor portion of the off-gases containing solid particulates into the housing and removing solid particulates therefrom within the housing; and
    returning hot off-gases from the housing after removal of solid particulates therefrom to the major portion of hot off-gases directed to the preheater,
    wherein the minor portion of off-gases containing solid particulates is controlled and deflected into the housing by horizontally disposed, spaced vanes positioned across a portal between the charging end of the rotary kiln and the housing.

9. The method as defined in claim 8 wherein said controlling and deflecting is effected by pivotal adjustment of said spaced vanes.

* * * * *